Sept. 14, 1943.    D. D. AREHART    2,329,380
TRAILER DRAFT CONNECTION
Filed March 24, 1941    4 Sheets-Sheet 1
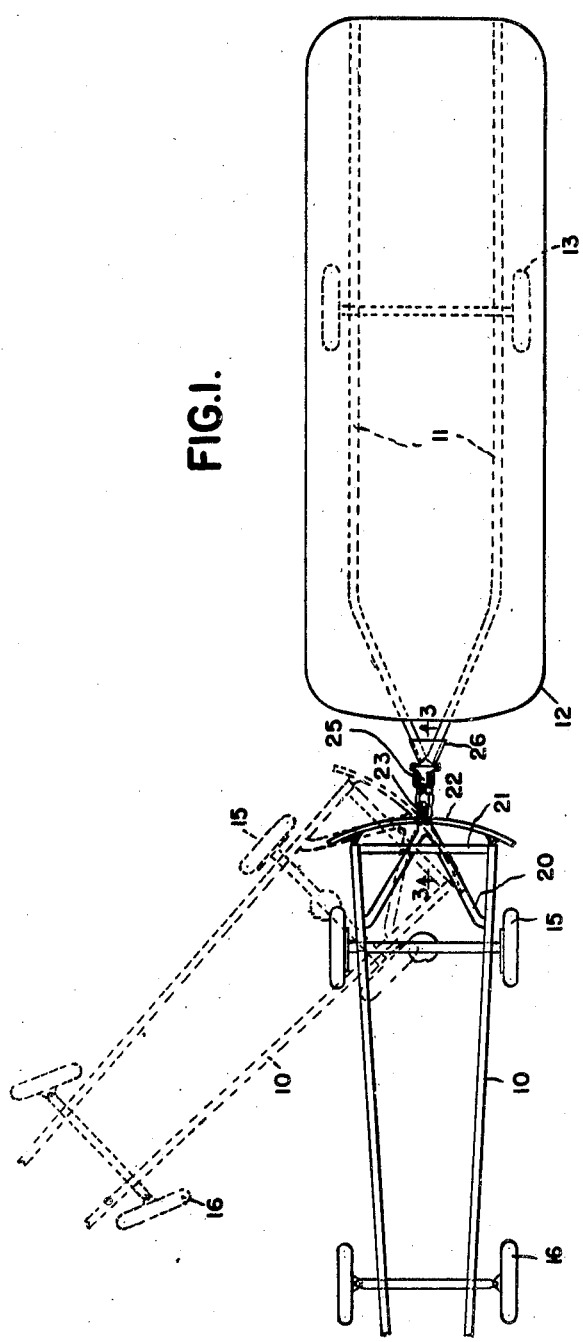
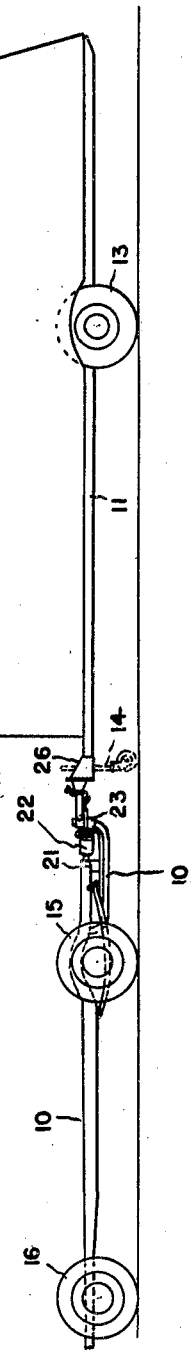
INVENTOR
DAVID D. AREHART
BY Whittemore Hulbert + Belknap
ATTORNEYS

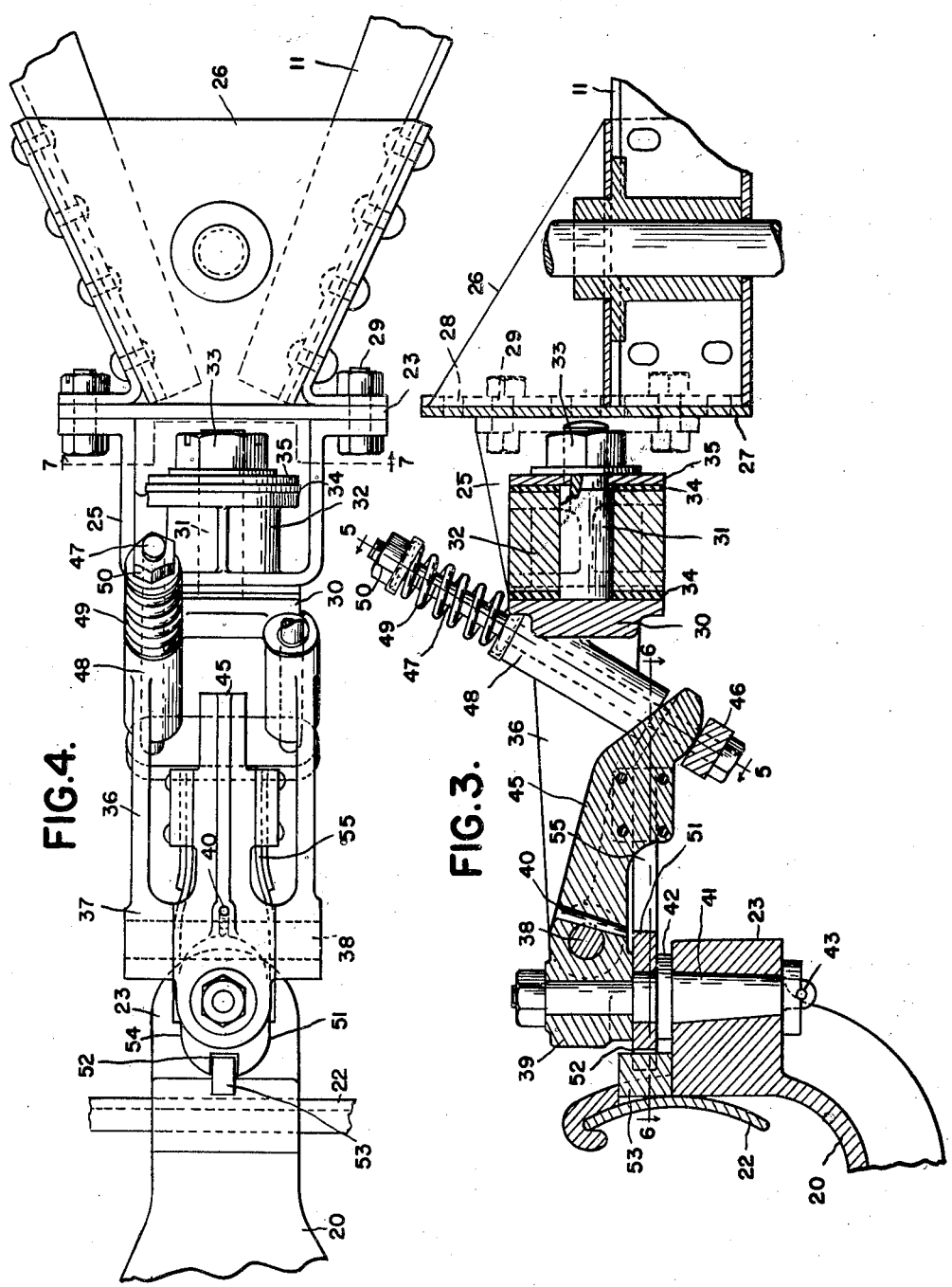

Sept. 14, 1943.	D. D. AREHART	2,329,380
TRAILER DRAFT CONNECTION
Filed March 24, 1941	4 Sheets-Sheet 3

INVENTOR
DAVID D. AREHART
BY *Whittemore Hulbert & Belknap*
ATTORNEYS

Sept. 14, 1943.                D. D. AREHART                 2,329,380
                        TRAILER DRAFT CONNECTION
                   Filed March 24, 1941         4 Sheets-Sheet 4

INVENTOR
DAVID D. AREHART
BY Whittemore Hulbert + Belknap
ATTORNEYS

Patented Sept. 14, 1943

2,329,380

UNITED STATES PATENT OFFICE 2,329,380

TRAILER DRAFT CONNECTION

David D. Arehart, Flint, Mich., assignor to Palace Travel Coach Corporation, Flint, Mich., a corporation of Michigan Application March 24, 1941, Serial No. 384,987

8 Claims. (Cl. 280—33.44)

The invention relates to trailer draft connections such, for instance, as are used in connecting trailer cars to automobiles.

It is the primary object of the invention to avoid the oscillations which usually occur with such draft connections in both vertical and horizontal planes.

It is a further object to maintain a substantially rigid connection between the frames of the tractor and trailer vehicles traveling over a level road bed and in a substantially straight line, while at the same time permitting relative angular movement between these frames when necessary, as in turning or change in slope of the road.

A still further object is to obtain a better distribution of the load upon the supporting wheels, particularly with trailers of the type where a portion of the load is normally carried by the tractor.

With these objects in view, the invention consists:

First, in the construction of a trailer draft connection which is adapted for rigid attachment to both the tractor and trailer frames;

Second, in a construction which, while permitting relative angular movement between the members thereof under predetermined stresses, is normally held sufficiently rigid to resist oscillations; and Third, in various features of more specific construction as hereinafter set forth.

In the drawings:

Fig. 1 is a plan view, partially diagrammatic, of a trailer and towing vehicle chassis connected by a coupling means embodying features of this invention;

Fig. 2 is a view thereof in side elevation;

Fig. 3 is an enlarged view taken on a line corresponding to line 3—3 of Fig. 1, showing details of the coupler;

Fig. 4 is a plan view of Fig. 3;

Figure 5:
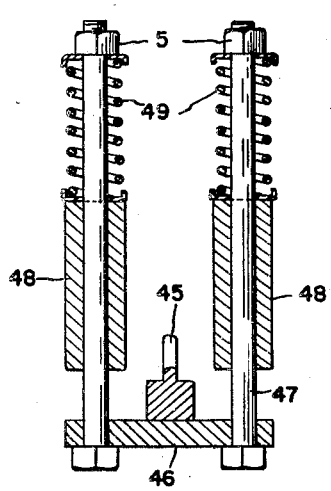
Fig. 5 is a view in section on a line corresponding to line 5—5 of Fig. 3.

Referring to Figs. 1 and 2, the numeral 10 designates the longitudinal frame members of the towing vehicle, and 11 the corresponding frame members of the trailer. The body 12 of the trailer is unbalanced on the wheels 13, so that a considerable portion of the weight is supported by the towing vehicle or car. The lifting device or jack 14 (shown in dash and dot lines) is used only to raise or lower the front end of the frame 11 to facilitate coupling or uncoupling with the towing car and to provide a supporting wheel for the front end of the trailer when the towing car is detached. It is drawn up clear of the ground or is removed entirely when the trailer is connected as shown.

It is obvious that if the frames 10 and 11 were rigidly connected to each other to form virtually one solid frame, the weight of the forward part of the combination would be proportionately borne by both the rear wheels 15 and the front wheels 16 of the towing car, provided that all of the wheels, including those of the trailer, were on a level surface at all times. However, since it is necessary to have joints in the coupling to permit the frames 10 and 11 to change angularity in relation to each other to compensate for travel over uneven ground and to permit turning to change direction of travel, an absolute rigid connection, of course, cannot be maintained. With a free joint in the coupling, the frame 10 becomes a lever fulcrumed either on the car rear wheels 15 or front wheels 16. In either case, by far the greater portion of the load is borne by the rear wheels 15. One object of the coupling shown herein is to provide a yielding resistance to the flexing or hinging action, which will maintain rigidity sufficient to support the normal load on the coupling, but which will yield and permit hinging action when travel over irregular surface compels the frames 10 and 11 to change angularity relative to each other.

In the specific construction shown herein, a sub-frame 20 is secured to a cross member 21 and side rails of the frame 10 of the towing car and is also partially supported by the bumper bar 22 as illustrated, it being important that the sub-frame 20 be a rigid extension of the frame 10. The sub-frame 20 carries a lug 23 which serves as a bearing block to support the weight of the front part of the trailer, and as a kingbolt bearing to permit turning.

Figure 7:
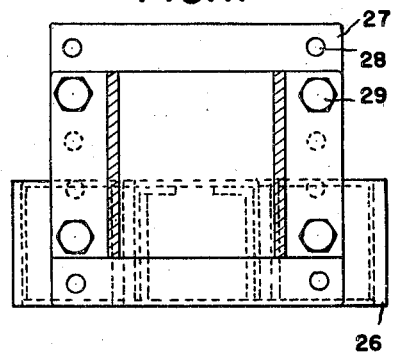
Fig. 7 is a view, partially in section, on a line corresponding to line 7—7 of Fig. 4, illustrating means of attaching the coupler at different heights on the trailer.
Figure 10:
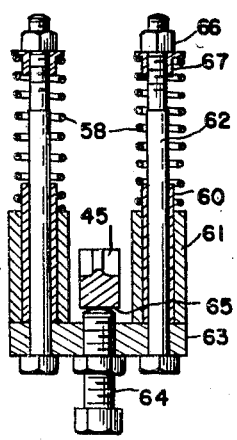
Fig. 10 is a view in section on a line corresponding to line 10—10 of Fig. 8.
Figure 11:
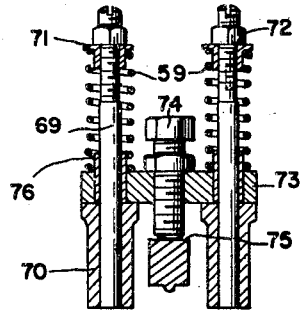
Fig. 11 is a view in section on a line corresponding to line 11—11 of Fig. 8.
Figure 9:
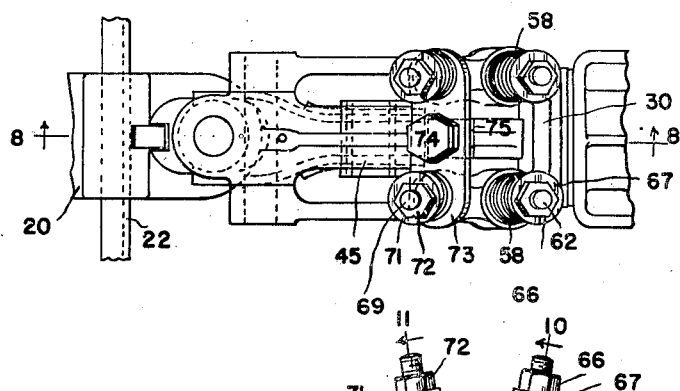
Fig. 9 is a plan view of Fig. 8.
Figure 8:
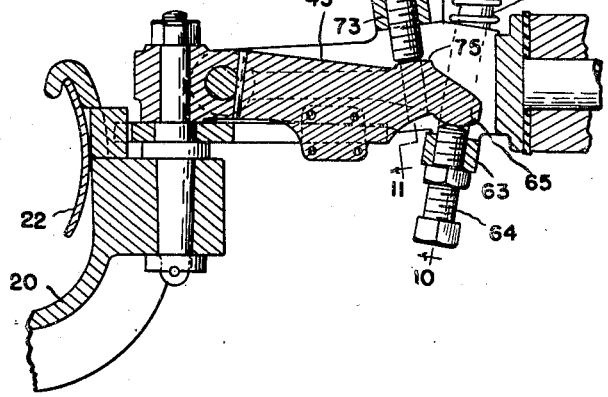
Fig. 8 is a view similar to Fig. 3 (in section on a line corresponding to line 8—8 of Fig. 9), showing a modification in the construction and operation of certain parts.

The coupling member shown in the drawings comprises a bracket 25 which is secured to the forward end of the trailer frame 11, preferably as close to the lifting jack 14 as good construction will permit. (See Figs. 3 and 4.) In the structure shown, plates 26 which are secured to the sides of the frame 11, are tied together by a plate 27. A series of holes 28 in the plates 26 and 27 for the bolts 29 provide means of attaching the bracket 25 at different heights to level the coupler with the lug 23. (See Fig. 7.)

A yoke 30 is connected to the bracket by a stud 31 which is rotatable in a bearing 32 and is held in assembly by a thrust nut 33. Turning of the stud 31 permits the yoke 30 to turn in a transverse vertical plane relative to the trailer frame 11, to permit the trailer to lean sidewise relative to the towing vehicle, to allow for travel over uneven roadway. If resistance to free turning action of the stud 31 is desired to check possible tendency to periodic rolling action, brake discs 34 may be interposed between the yoke 30 and a thrust disc 35, the degree of pressure being adjusted to suit by the nut 33. Obviously, this is only one of several means of yieldingly opposing free turning of the stud 31.

The yoke 30 has a pair of forwardly extending arms 36 terminating in bearings 37 in which is rotatably mounted a hinge pin 38. The pin 38 carries a bell crank lever 39 to which it is held in assembly by a lock pin 40. A downwardly extending kingbolt 41 of the lever 39 is rotatably fitted to the lug 23 on the towing car frame extension, the weight being borne by a thrust collar 42. The kingbolt may be prevented from accidentally jumping out of engagement with the lug 23, by the pin 43 as shown, or by any other suitable locking means.

In the construction shown in detail in Figs. 3, 4 and 5, a rearwardly extending arm 45 of the bell crank lever 39 has a surface on its lower side which is appropriately formed to engage a thrust bar 46 which is carried on the lower ends of a pair of pull rods 47. The rods 47 are slidably mounted in bearing bosses 48 on the yoke 30 and yieldingly hold the bar 46 against the lower side of the arm 45 by means of compression springs 49 and adjusting nuts 50.

Since the mounting of the kingbolt 41 in the lug 23 prevents any turning of the lever 39 in a vertical plane relative to the towing car frame 10, the connected ends of the frames 10 and 11 cannot sag and impose excessive load on the rear wheels 15 of the towing car, without compressing the springs 49. The nuts 50 may be adjusted to give the springs 49 sufficient stiffness to hold the lever arm 45 from being turned by the normal load on the hinge pin 38, but to yield when contour of the roadway compels the arm 45 to swing downwardly. Since the arm is free to move upwardly away from the thrust bar 46, there is no resistance, in addition to normal load, to flexing action between the frames 10 and 11 when the wheels 15 are compelled to rise above the plane of the wheels 16 and 13. By adjusting the spring tension to sustain more than the normal load, an arched effect of the connected vehicle frames may be obtained to transfer a still greater portion of the load to the front wheels of the towing car.

Figure 6:
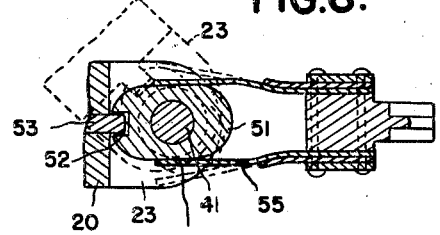
Fig. 6 is a view in section on a line corresponding to line 6—6 of Fig. 3.

To obviate side-swaying of the front end of the trailer and rear end of the towing car, it is desirable to provide resistance to free turning of the kingbolt 41 in the lug 23. One means of accomplishing this result comprises a cam 51 rotatably mounted on the bolt 41 and having a notch 52 appropriately formed to engage a key 53 which is secured to the lug 23 (see Fig. 6). It is apparent that any movement of the trailer or towing vehicle out of alignment with each other in a horizontal plane must turn the cam 51 on the bolt 41. The cam 51 has flat faces 54 on opposite sides which are engaged by flat or leaf springs 55 which are anchored to the arm 45 and bear against the cam. Rotation of the cam must swing the springs 55 outwardly, as shown by dash and dot lines in Fig. 6. The springs are designed with sufficient stiffness to resist sidesway of the trailer, but to yield when the towing vehicle is turned to change direction of travel as desired. The cam is preferably so shaped that it meets the greatest resistance to turning when the two vehicle frames are approximately in alignment for travel straight ahead, there being only frictional resistance to continued turning after the frames 10 and 11 have been swung considerably out of alignment with each other and the springs 55 are in contact with curved surfaces on the cam 51.

In the construction shown in Figs. 3, 4 and 5, the springs 49 provide resistance to downward flexing of the coupling and serve to distribute a greater portion of the trailer weight to the front wheels of the car. There is no resistance to upward flexing except the weight on the hinge pin 38. This resistance is sufficient to overcome any tendency of the front end of the trailer to lift up while in motion, if the trailer wheels are located so that a considerable portion of the trailer weight is borne by the towing car. However, if little or none of the trailer weight is borne by the towing car, the front end of the trailer will tend to swing upwardly while in motion and lift the arm 45 off the bar 46. This condition would exist if the location of trailer wheels and distribution of trailer load were not in proper relation to give correct balance.

In the form of construction shown in Figs. 8, 9, 10 and 11, a pair of springs 58 oppose downward movement of the arm 45 in a manner similar to that shown in Figs. 3, 4 and 5, and an additional pair of springs 59 oppose upward movement of the arm 45. A preferred form of mounting for the springs 58 comprises bushings 60 which are pressed tightly into the bosses 61 and project far enough to serve as retainers for the lower ends of the springs 58 and also serve as guide bearings for the pull rods 62. The rods 62 carry a thrust bar 63 in which is threaded a thrust screw 64 which engages a bearing surface 65 on the lower side of the arm 45. Tension of the springs 58 may be varied by adjusting nuts 66 which engage thrust washers 67, the latter being appropriately formed to serve as retainers for the upper ends of the springs.

The springs 59 are mounted on studs 69 which are threaded or otherwise secured in bosses 70 on the yoke 30, the upper ends of the studs carrying retainers 71 and adjusting nuts 72. The lower ends of the springs 59 bear against a thrust bar 73, which is slidably mounted on the studs 69 and carries a thrust screw 74 which engages a bearing surface 75 on the upper side of the arm 45. In the form of construction shown, the bushings 76 in the bar 73 project upwardly far enough to serve as spring retainers and also increase the length of guide bearing.

When both of the thrust bars 63 and 73 are in contact with the yoke or frame members 30 and the thrust screws 64 and 74 are both in contact with the arm 45, the latter cannot oscillate in either direction without compressing one pair of the springs. By means of the thrust screws, the arm 45 may be adjusted to any position between the bars 63 and 73 and consequently determine the angular relation between the trailer frame 11 and the towing car frame 10. By adjusting the arm 45 to a position above the position for parallel alignment of the frames 10 and 11, weight on the rear wheels of the towing car is reduced, and more weight is transferred to the front wheels. This effect depends upon the springs 58 having sufficient resistance to support the normal load on the thrust bar 63 and thus maintain rigidity up to the desired yielding point.

The springs 59 oppose any tendency of the front end of the trailer to oscillate upwardly when too small a portion of the weight is borne by the towing car. By adjusting the arm 45 to a position below the position for parallel alignment of the frames 10 and 11, weight on the front wheels of the towing car is reduced, which tends to shift more of the car weight to its rear wheels and thus oppose upward oscillation of the front end of the trailer. The nuts 66 and 72 may be adjusted to give different degrees of resistance to the two pairs of springs 58 and 59, or springs of different rates of capacity may be used, as desired, to meet different conditions of weight distribution.

With this means of controlling resistance to flexing of the coupling, both downwardly and upwardly, the wheels of the trailer can be placed farther forward than would otherwise be permissible, thereby placing substantially all of the trailer weight directly on the trailer wheels without causing the trailer to sway. The means of adjusting each pair of springs independently of the other pair is a decided advantage especially in the use of cargo trailers or any other trailer in which the center of gravity location may be changed at different times.

It is obvious that the objects set forth in this specification could be accomplished with various changes in details of construction. Therefore, it is to be understood that this invention is not to be limited to any specific form or arrangement of parts.

What I claim as my invention is:

1. A trailer draft connection comprising members adapted for rigid connection respectively to the frames of the tractor and trailer vehicles, a pivotal connection between the members for permitting relative angular movement thereof in both vertical and horizontal planes, and means for normally holding said members in rigid relation to each other in each of said planes yieldable under a predetermined stress and operable in each of said planes in all positions of adjustment of said members in the other of said planes.

2. A trailer draft connection comprising members adapted for rigid connection respectively to the frames of the tractor and trailer vehicles, a pivotal connection between said members for permitting relative angular movement in both vertical and horizontal planes, and means for normally holding said members in rigid alignment when said tractor is traveling in a straight line, said means being yieldable upon change in direction of movement of the tractor and also upon change of angle in the road bed remaining operable in each of said vertical and horizontal planes in all positions of angular adjustment of said members in the other of said vertical and horizontal planes.

3. A trailer draft connection comprising members adapted for rigid connection respectively with the frames of the tractor and trailer vehicles, a member vertically adjustably secured to one of said members to be held in rigid relation thereto, a swivel connection with said last mentioned member for relative rotation in a transverse plane and a pivotal connection with the other of said first mentioned members for relative angular movement in longitudinal, vertical and horizontal planes, means for holding said pivotally connected members in rigid alignment in a vertical plane resiliently yieldable under a predetermined stress, and means for resiliently and frictionally resisting relative angular movement of said pivotally connected members in a horizontal plane.

4. A trailer draft connection comprising a sub-frame attachable to the frame of a tractor vehicle to be rigid therewith and to extend in rear thereof having also a hooked connection with the bumper for further support, a member adapted for rigid connection with the frame of the trailer to extend forward thereof, a member having a horizontal pivot connecting it to the forward end portion of the last mentioned member and overlapping the rear end of said sub-frame, a king-pin connecting said overlapping portions, resilient means for resisting relative angular movement of said members connected by the horizontal pivot yieldable under a predetermined stress, and resilient means for resisting relative turning movement of the members connected by said king-pin also yieldable under a predetermined stress.

5. A trailer draft connection comprising a sub-frame rigidly attachable to the frame of the tractor vehicle to extend centrally in rear thereof, the latter portion being provided with a hook for engagement with the rear bumper of the tractor to afford further support, a king-pin engaging said central rear portion, a member mounted on said king-pin to extend rearwardly therefrom, a member adapted for rigid connection with the frame of the trailer to extend forward therefrom, a member having a swivel connection with said forwardly extending portion and also provided with a forwardly extending bifurcated portion for embracing the member mounted on said king-pin, a horizontal pivot connecting the latter member with said bifurcated portion adjacent to said king-pin, a U-shaped yoke having parallel portions slidably engaging bearings in the furcations of said bifurcated member to extend upward beyond the same and with a connecting portion extending beneath the rear end of said member connected to the king-pin, springs on the upwardly extending parallel portions for yieldably resisting downward movement thereof, an eccentric cam on said king-pin, and resilient arms connected to the rear portion of the member pivoted on said king-pin, said arms extending forward to embrace said eccentric cam and to resiliently and frictionally resist rotation of said last mentioned member on said king-pin, whereby oscillation of said draft connection is resisted in both horizontal and vertical planes.

6. A trailer draft connection comprising members adapted for rigid connection respectively to the frames of the tractor and trailer vehicles, a king-pin secured to and projecting upward from the tractor member, a member pivoted on said king-pin projecting rearward and slightly downward therefrom, a bifurcated member secured to said trailer member embracing the member pivoted on said king-pin and connected thereto by a horizontally extending pivot, a U-shaped member slidably secured in inclined bearings on said bifurcated member and engaging the under side of the rear end of said rearwardly extending member, springs for yieldably resisting downward movement of said U-shaped member and thereby resisting upward swinging movement of said bifurcated member about said horizontal pivot, a cam mounted on said king-pin beneath said rearwardly extending member, said cam being held from rotation on said king-pin, a pair of spring arms secured to said rearwardly extending member and projecting forward on opposite sides of said cam to frictionally engage the same, said cam being so fashioned as to spread said spring arms upon a pivotal movement of said rearwardly extending member on said king-pin and thereby resisting oscillations of said member on said king-pin.

7. A trailer draft connection comprising members adapted for rigid connection respectively to the frames of the tractor and trailer vehicles, a king-pin secured to and projecting upward from the tractor member, a member pivoted on said king-pin projecting rearward and slightly downward therefrom, a bifurcated member secured to said trailer member embracing the member pivoted on said king-pin and connected thereto by a horizontally extending pivot, a U-shaped member slidably secured in inclined bearings on said bifurcated member and engaging the under side of the rear end of said rearwardly extending member, springs for yieldably resisting downward movement of said U-shaped member and thereby resisting upward swinging movement of said bifurcated member about said horizontal pivot.

8. A trailer draft connection comprising members adapted for rigid connection respectively to the frames of the tractor and trailer vehicles, a king-pin secured to and projecting upward from the tractor member, a member pivoted on said king-pin projecting rearward therefrom, a bifurcated member secured to said trailer member embracing the member pivoted on said king-pin and connected thereto by a horizontally extending pivot, a pair of yokes respectively above and below said rearwardly extending member and slidable in bearings arranged at different angles in the furcations of said member, and springs for resiliently resisting movement of said yokes in said bearings whereby relative movement of said tractor and trailer members in a vertical plane is resisted in each direction by said springs.

DAVID D. AREHART.